Patented July 22, 1952

2,604,448

UNITED STATES PATENT OFFICE 2,604,448

METHOD OF REDUCING THE VISCOSITY AND GEL STRENGTH OF OIL BASE DRILLING FLUID

Doyne L. Wilson, Pasadena, Calif., assignor to Oil Base, Inc., Compton, Calif., a corporation of California No Drawing. Application February 23, 1949, Serial No. 77,983

6 Claims. (Cl. 252—8.5)

This invention relates to a method of reducing the viscosity of oil base drilling fluids of the type used in the rotary method of drilling wells. An oil base drilling fluid may be defined as a drilling fluid which comprises essentially a mineral oil, such as a crude petroleum oil or distillate thereof. Normally an oil base drilling fluid contains, in addition to mineral oil, non-aqueous additives. These additives are employed for imparting desirable characteristics to the oil base such as weight, gel strength, plastering properties, reduced fluid loss, etc. To serve properly an oil base drilling fluid must have certain characteristics. The general properties desired in an oil base drilling fluid are that the viscosity of the fluid must be within allowable limits; the fluid should maintain a good gel strength throughout the temperature range to be employed; the fluid should possess good plastering properties, and leave the formation in a condition to be readily deplastered; the drilling fluid should be susceptible of manufacture with a weight range of at least 58 to 100 lbs. per cu. ft., and the fluid should be capable of regeneration to remove water after the fluid becomes contaminated therewith. Sometimes the additives employed, together with mineral oil, for forming an oil base drilling fluid results in a drilling fluid which as initially prepared has too high a viscosity or gel strength for satisfactory operations. Likewise, oil base drilling fluids which when initially prepared have satisfactory gel strength and viscosity may upon storage develop excessive gel strength and viscosity. More often, drilling fluids during use in a well develop excessive viscosity or gel strength. When an oil base drilling fluid acquires excessive viscosity and gel strength it becomes necessary to reduce these characteristics within allowable limits. It has heretofore been customary to add further mixing oil or mineral oil to the oil base drilling fluid for this purpose. In other words, a conventional method of reducing this excessive viscosity and gel strength has been to merely dilute the oil base drilling fluid with further mineral oil. This has naturally an effect in diluting the characteristics of the drilling fluid imparted by the additives. Particularly, where large quantities of additional mineral oil is required to effect the desired reduction of viscosity and gel strength the weight of the drilling fluid may be reduced to the point where the hydrostatic head of the drilling fluid in use on the formation is dangerously lowered. Furthermore, the reduction of the viscosity of the drilling fluid by this dilution method is an expensive and time consuming process. It is, therefore, highly desirable that there be available some method of reducing the viscosity and gel strength of drilling fluids where needed other than this dilution process.

The main object of this present invention is, therefore, to provide a process for reducing excessive viscosity and gel strength of oil base drilling fluids which does not rely on mere dilution of the drilling fluid with further mineral or mixing oil.

Another object of the present invention is to provide a process for reducing the viscosity or gel strength of drilling fluids which process does not substantially alter the weight range of the drilling fluid.

The present invention is predicated upon the discovery that the viscosity and gel strength of oil base drilling fluids may be reduced by the addition thereto of small quantities of terpenes and their oxygenated derivatives. These oxygenated derivatives include the terpene alcohols, terpene ketones and terpene ethers.

It is not necessary that pure terpene derivative materials be employed as natural products having high contents of such terpene or terpene derivative material may be employed. Thus, for example, pine oils which have a high content of alpha-terpineol are most effective. Such commercial products as pinene consisting of about 92% alpha-pinene (dextro), 4 to 5% camphene, with the remainder made up of dipentene and other terpene hydrocarbons is effective. Also steam distilled wood turpentine may be used. One commercial product employed satisfactorily contains approximately 90% bicyclic terpenes (made up of about 80% alpha-pinene and 10% of a mixture of beta-pinene and camphene) and 10% of monocyclic terpenes. A commercial product known as dipentene obtained from the fractionation of extracts of pine wood is found highly satisfactory. This commercial product has substantially the following compositions:

| | Per cent |
|---|---|
| Alpha and beta-pinenes | 5.0 |
| Para-menthane | 13.7 |
| Alpha-terpinene | 5.2 |
| Para-cymene | 17.4 |
| Dipentene (inactive limonene) | 50.5 |
| Terpinolene | 5.2 |
| Delta- 2.4.8. para menthadiene | 2.0 |
| Fenchone | 1.0 |

Another commercial product known as alpha-terpineol contains 95% or more of tertiary terpene alcohols, principally alpha-terpineol, para-1 menthen-8-ol, is found highly satisfactory.

Another commercial product known as Yarmor 302 pine oil fractionated from oils extracted from pine oil is found highly satisfactory, such product having substantially the following compositions:

| | Per cent |
|---|---|
| Alpha-terpineol | 58.9 |
| Terpinen-4-ol | 8.3 |
| Borneol and alpha-fenchyl alcohol | 7.8 |
| Dihydro-alpha-terpineol, beta fenchyl alcohol and isoborneol | 10.0 |
| Methyl chavicole and anethole | 5.3 |
| Ketones | 9.0 |

A product also known as Hercosol No. 80 was found highly satisfactory, which consisted of a mixture of 80% monocyclic terpene hydrocarbons and 20% bicyclic terpene ketones. The ketone fractionation is merely a mixture of fenchone, isofenchone, camphor and its isomers.

Another product known as Terposol No. 3 was found highly satisfactory which consisted of a mixture of about 60% mono- and di-terpinyl, methyl ethers, with the mono ether present in major proportions, and 40% of tertiary terpene alcohols.

Another product found highly satisfactory was Terposol No. 8 which product consists of a mixture of terpinyl ethylene glycol ether, terpinyl bis (ethylene glycol) ether, and di-terpinyl ethylene glycol ether.

It has been found that the addition of such terpene or terpene derivatives are effective in all classes of oil base drilling fluids which have excessive viscosity or gel strength for reducing the viscosity or gel strength of such materials. While oil base drilling fluids may contain many added ingredients, such as lamp black, calcium oxide, strontium oxide, magnesium oxide, soap, etc. for the purpose of imparting gel strength to the fluid, they may contain various weight materials such as calcium carbonate, oyster shell lime, barytes, etc. The most satisfactory oil base drilling fluids are those constructed in accordance with the Patents Nos. 2,316,967 and 2,316,968 to George Miller issued April 20, 1943, and the process of the present invention is of particular value for reducing the viscosity and gel strength of such treating fluids. Particularly with the operation of such drilling fluids as the fluids become contaminated with water this water contamination is reduced by treating the fluids with additional calcium oxide. This addition may result in excessive viscosity or gel strength in the fluid and the process of the present invention is particularly useful for eliminating such excessive viscosity or gel strength without requiring the addition of further mineral or mixing oil.

The addition of the terpene or terpene derivatives to the oil base drilling fluid may be carried out in a variety of ways. Generally an oil base drilling fluid to be used is first prepared without the addition of any of the terpene or terpene derivatives and placed in use in the drilling well. When the viscosity of this circulating drilling fluid rises to the point that it presents difficulty to the pumps handling the same the terpene or terpene derivatives are added to this oil base drilling fluid being circulated in the well at some suitable point in the circulating stream. Thus, for example, if the oil base drilling fluid being discharged from a well has excessive viscosity, the terpene or terpene derivative material may be added in a small stream to the drilling fluid as it emerges from the well. So added it will facilitate the settling of the sand or cuttings present in the returning drilling fluid. By the addition of the terpene or terpene derivative material sand settles more readily in the flow ditch, and likewise the removal of cuttings over the shaker screen is facilitated. The terpene and terpene derivative material may be, however, added at the flow ditch beneath the shaker screen, the suction pit, or the mixing pit. In other cases the terpene or terpene derivative material may be added to the drilling fluid at the time the same is prepared either in a premixed condition for transportation to the well, or at the well from premixed fluid or sack material. Furthermore, when oil base drilling fluid is stored and acquires excessive gel strength or viscosity, it may be added to said stored material through the use of agitation with pumps and mud guns to secure thorough mixing.

The amount of terpene or terpene derivative material to be employed in the process of the present invention will, of course, depend upon the characteristics of the particular oil base drilling fluid under consideration and the amount of viscosity and gel strength reduction desired. I have employed as low as about 0.05% of the terpene or terpene derivative material to as high as about 10%. Usually in actual operation conditions in oil well practice, satisfactory control is effected by additions of less than 1%.

The process of the present invention, together with various further objects and advantages of the invention will be more fully understood from the following description of a number of preferred examples of the invention. In the examples given the viscosity of the untreated and treated oil base drilling fluids was determined by means of a Stormer viscosimeter in terms of driving weight, in grams, required to turn the spindle 600 R. P. M. while immersed in the sample at a given temperature and expressed in centipoises. The following tabulation gives five different examples of viscosity reduction in accordance with the process of the present invention as actually carried out under commercial practice. In this tabulation the material marked "Chem X" was pine oil. The oil base drilling fluid used in these examples and referred to as "Black Magic" is an oil base drilling fluid constructed in accordance with the aforementioned Miller patents. Such oil base drilling fluid as initially prepared contains about 50% by weight of refined mineral oil, such as stove oil, about 33% by weight of weighting material such as ground oyster shells, about 4% of calcium hydroxide, and about 13% of blown asphalt having a melting point of about 303° F. and a penetration of about 7 at 25° C. In the examples given, however, the drilling fluid to which the terpene or terpene derivative material was added was that in use in an actual well during drilling so that the original drilling fluid was, of course, to some extent contaminated by sand, cuttings and other materials picked up by the drilling fluid through the use thereof.

| Example | Bbls. Black Magic Oil Base-Fluid | Volume Chem X | Percent of Chem X | Viscosity Before | Viscosity After | Percent Reduction in Viscosity |
|---|---|---|---|---|---|---|
| | | Bbl. | | | | |
| 1 | 450 | 1.0 | 0.2 | 330 | 275 | 17.0 |
| 2 | 450 | 2.0 | 0.4 | 275 | 225 | 31.8 |
| 3 | 600 | 0.5 | 0.08 | 220 | 160 | 27.0 |
| 4 | 400 | 0.3 | 0.075 | 310 | 215 | 30.6 |
| 5 | 400 | 1.7 | 0.43 | 310 | 140 | 55.0 |

As before stated each of the other terpene and terpene derivative materials have been used in other examples of the invention and the invention is further illustrated by the following additional examples of the invention.

*Example 6*

400 grams of oil base drilling fluid "premix" weighing 58 lb. per cubic foot, prepared from blown asphalt and diesel oil to a Stormer viscosity of 165 centipoises was stirred five minutes in a Waring Blendor with 40 cc. of Hercules dipentene No. 122. After standing 24 hours the Stormer viscosity was 125 centipoises at 30° C., a reduction of 24%.

*Example 7*

400 grams of oil base drilling fluid "premix" prepared from blown asphalt and diesel oil to a Stormer viscosity of 165 centipoises was stirred five minutes in a Waring Blendor with 40 cc. of Hercules Yarmor 302 pine oil. After standing 24 hours the Stormer viscosity at 30° C. was 26 centipoises, a reduction of 84.3%.

*Example 8*

400 grams of oil base drilling fluid "premix" prepared from blown asphalt and diesel oil to a Stormer viscosity of 165 centipoises was stirred five minutes in a Waring Blendor with 40 cc. of steam distilled wood turpentine. After standing 24 hours the Stormer viscosity at 30° C. was 110 centipoises, a reduction of 33%.

*Example 9*

400 grams of oil base drilling fluid "premix" prepared from blown asphalt and diesel oil to a Stormer viscosity of 165 centipoises was stirred five minutes in a Waring Blendor with 40 cc. of Hercules Terposol No. 3. After standing 24 hours the Stormer viscosity was 85 centipoises at 30° C., a reduction of 48.5%.

*Example 10*

400 grams of oil base drilling fluid, weighing 76 lbs. per cubic foot, prepared from blown asphalt, diesel oil, calcium oxide, water and ground limestone to a Stormer viscosity requiring 1150 grams driving weight for 600 R. P. M. at 30° C. was stirred five minutes in a Waring Blendor with 20 cc. of Hawxhurst Amber pine oil. After standing overnight the Stormer viscosity required a driving weight of 500 grams at 30° C., a reduction of 59.2%.

*Example 11*

An oil base drilling fluid "premix", weighing 58 lbs. per cubic foot, was weighted to 152 lbs. per cubic foot with finely ground (92% through 325 mesh) barytes ore, producing an extremely viscous paste. 5% of Hercules Yarmor No. 302 pine oil rendered the plastic mass quite fluid, so that it could be handled by pumps.

The last cited examples exemplify the use of a new process for effecting forced reduction on oil base drilling fluids ranging from 58 to 152 lbs. per cu. ft.

In each of the foregoing examples of the invention the oil base drilling fluid to which the terpene material was added contained asphalt as a plastering agent. In the following examples the oil base drilling fluid contained no asphalt. The oil base mud #1 was a crude oil containing 9% aluminum soap and 15% of weight material such as calcium carbonate, while the oil base mud #2 is crude oil containing 1.4% rubber latex and 15% weight material such as calcium carbonate.

| Oil Base Mud | Per Cent Pine Oil | Stormer Viscosity, cps. | Per Cent Reduction in Viscosity | Temperature, °C. |
|---|---|---|---|---|
| No. 1 | 0 | 235 | | 31 |
| No. 1 | 1 | 218 | 7.25 | 31 |
| No. 1 | 2 | 198 | 11.6 | 31 |
| No. 1 | 3 | 188 | 19.8 | 31 |
| No. 1 | 4 | 179 | 23.8 | 31 |
| No. 1 | 5 | 165 | 29.8 | 31 |
| No. 2 | 0 | 378 | | 31 |
| No. 2 | 1 | 260 | 26.5 | 31 |
| No. 2 | 2 | 207 | 45.5 | 31 |
| No. 2 | 3 | 203 | 46.5 | 31 |
| No. 2 | 4 | 198 | 48.0 | 31 |
| No. 2 | 5 | 175 | 54.0 | 31 |

The above examples illustrate the viscosity reduction effected by the addition or terpene or terpene derivative material to oil base drilling fluid other than those having asphalt therein.

While the particular examples of the process herein described are well adapted to carry out the objects of the present invention various modifications and changes may be made and this invention is of the scope set forth in the appended claims.

I claim:

1. A drilling fluid having a suspending medium consisting solely of a mineral oil, said fluid including a compound selected from the group consisting of terpenes, terpene alcohols, terpene ketones and terpene ethers, the amount of such compound being between 0.05% and 10% by weight of the remaining ingredients.

2. A mineral oil base drilling fluid which includes dipentene, the dipentene being present from 0.05% to 10% by weight of the remaining ingredients.

3. A mineral oil base drilling fluid which includes steam-distilled wood turpentine, the wood distilled turpentine being present from 0.05% to 10% by weight of the remaining ingredients.

4. A mineral oil base drilling fluid which includes pine oil, the pine oil being present from 0.05% to 10% by weight of the remaining ingredients.

5. A mineral oil base drilling fluid which includes alpha-terpineol, the alpha-terpineol being present from 0.05% to 10% by weight of the remaining ingredients.

6. A mineral oil base drilling fluid which includes camphor, the camphor being present from 0.05% to 10% by weight of the remaining ingredients.

DOYNE L. WILSON.

REFERENCES CITED

The following references are of record in the file of this patent:

UNITED STATES PATENTS

| Number | Name | Date |
| --- | --- | --- |
| 2,217,926 | Van Campen | Oct. 15, 1940 |
| 2,297,660 | Mazee | Sept. 29, 1942 |
| 2,350,154 | Dawson et al. | May 30, 1944 |
| 2,430,039 | Anderson | Nov. 4, 1947 |
| 2,461,483 | Self | Feb. 8, 1949 |